United States Patent [19]

Dambrine et al.

[11] Patent Number: 5,718,926
[45] Date of Patent: Feb. 17, 1998

[54] DIE FOR FORMING EXTRUDATE HAVING TWO VISIBLE LONGITUDINAL COMPONENTS

[75] Inventors: Marc Dambrine, Ailly-S/Somme, France; Osvaldo La Violette Geromini, Valeyres/Rances, Switzerland; Denis Janot, Fouilloy, France

[73] Assignee: Nestec S.A., Vevey, Switzerland

[21] Appl. No.: 668,399

[22] Filed: Jun. 21, 1996

[30] Foreign Application Priority Data

Jun. 22, 1995 [EP] European Pat. Off. ............ 95201685

[51] Int. Cl.$^6$ ............................................. B29C 47/06
[52] U.S. Cl. ........................ 425/131.1; 264/172.14; 264/173.16; 425/133.1; 425/462
[58] Field of Search ..................... 425/130, 131.1, 425/131.5, 133.1, 462; 264/172.14, 173.16, 176.1

[56] References Cited

U.S. PATENT DOCUMENTS

| | | | |
|---|---|---|---|
| 2,174,779 | 10/1939 | Delorme . | |
| 3,458,390 | 7/1969 | Ando et al. | 425/131.5 |
| 3,849,044 | 11/1974 | Ando et al. | 425/131.5 |
| 4,370,114 | 1/1983 | Okamoto et al. | 425/131.5 |
| 4,381,274 | 4/1983 | Kessler et al. | 425/131.5 |
| 4,459,094 | 7/1984 | Sanabria | 425/131.1 |
| 4,786,243 | 11/1988 | Kehoe . | |
| 5,256,050 | 10/1993 | Davies | 425/131.5 |
| 5,486,049 | 1/1996 | Boatman et al. . | |

FOREIGN PATENT DOCUMENTS

| | | |
|---|---|---|
| 1230005 | 12/1987 | Canada . |
| 0169126 | 1/1986 | European Pat. Off. . |
| 2572899 | 5/1986 | France . |
| 60-20193 | 2/1985 | Japan . |
| 60-201923 | 10/1985 | Japan . |

OTHER PUBLICATIONS

Patent Abstracts of Japan, vol. 10, No. 51(M–457) [2108], abstract of Takehiko et al., Japanese Patent Document No. JP–A–60 201923 (1985).
Derwent Abstract, Acc. No. C85–126919, abstract of Takehiko, et al., Japanese Patent Document No. JP–A–60 201923 (1985).

*Primary Examiner*—Jay H. Woo
*Assistant Examiner*—Joseph Leyson
*Attorney, Agent, or Firm*—Vogt & O'Donnell LLP

[57] ABSTRACT

A die for extrusion of an extrudate from an extruder has a tubular member, a hollowed distributor portion and a hollowed nozzle portion configured and arranged so that extrudate issuing from the die has two visible longitudinal components. The tubular member has three successive and integral portions wherein first and third portions are, in cross-section, continuous and wherein the second portion is, in cross-section, discontinuous. The first tubular member portion has an interior wall surface which, in cross-section, has radial projections and recesses therebetween so that the interior wall surface defines a shape which is an outline of a star-like shape, and the second tubular member portion has longitudinal openings which are in alignment with the first portion projections. The distributor portion surrounds the first tubular member portion to define a chamber and has an opening into the chamber, and the nozzle portion has a first end integral with the distributor portion and extends to the third tubular member portion to define a chamber extension and end enclosure.

7 Claims, 2 Drawing Sheets

DIE FOR FORMING EXTRUDATE HAVING TWO VISIBLE LONGITUDINAL COMPONENTS

BACKGROUND OF THE INVENTION

The invention relates to extrusion dies and in particular to dies for extrusion of two component substances and to an extrusion die located at the outlet of an extrusion-cooking or other extrustion system for manufacture of products, including such as sausages or croquettes, having coloured longitudinal stripes of two different colours.

European Patent Application Publication No. 0 169 126 already relates to an installation for manufacturing a composite food product by extrusion. However, although this type of installation does indeed allow manufacture of a bi-component product, it either has a filling which is absolutely invisible from the outside and an external jacket, which alone is visible, or the two components are side by side.

French Patent Application Publication No. 2 572 899 relates to filled products manufactured by extrusion using a die which includes an internal tube and an external tube, these being co-axial, allowing splitting into two flows. These simple-geometry tubes do not allow products to be obtained wherein filling is visually perceptible at the surface of the extrudate. In addition, the two flows come into contact with each other only a short distance from the outlet, which limits the possibilities of recombination.

U.S. Pat. No. 4,786,243 relates to a product having longitudinal stripes, but the technical solution necessarily employs two extruders, the flows of which are joined together in coaxial tubes provided with a central deflector. This technology, and in particular this deflector, can cause problems in the flow and recombination of the two extrudates on exiting the machine.

SUMMARY OF THE INVENTION

The object of the present invention is to provide an extrusion die allowing manufacture of a bi-component product in which the consumer may immediately see that it is a composite product, one of the components being formed during manufacture to have an outline of a shape having star-like radial projections and recesses which provide in the composite product, as illustrated by the drawing FIG. 4 in particular, a ribbed structure, which also is referred to herein as a "star" shape. Moreover, the die according to the invention allows intimate recombination of the two flows.

To that end, the present invention provides a two-component extrusion die, located downstream of an extrusion-cooking or extrusion system of the split-compartment twin-screw type or of the single-screw type with splitting of the flow into two, comprising.

a) at the extrusion system flow channel outlet for one of the components a supply tube for the central component of the two-component product, the said tube having, from the upstream side to the downstream side, a first zone having a cross-section in the form of a star, a second zone with at least two longitudinal openings in order to allow inflow of the second component, the said openings emerging between the branches of the star and a third zone allowing the two components to combine;

b) a distributor surrounding the first zone of the tube in order to create a chamber and allow inflow of the second component through the longitudinal openings in the supply tube; and c) a nozzle extending the distributor, reducing the volume of the inflow chamber for the second component and surrounding the third zone of the supply tube.

The present invention also includes apparatus comprising a twin-screw extruder or single-screw extruder and comprising at least one die as described herein, and preferably, the apparatus comprises an extruder with two dies.

DETAILED DESCRIPTION OF THE INVENTION

In general, a twin-screw is used in which a component A is made to flow through a barrel which includes the rotationally driven first screw in order to allow component A to advance, and a component B is introduced into a second barrel provided with a likewise rotationally driven second screw. The two barrel compartments are separated from each other, and the extrusion die according to the invention is located at the exit of the extruder. It is also possible to arrange two dies at the exit of the extruder.

It is also possible to work with a single screw, in which there is a single flow of product. In this case, it is necessary to provide a flow-splitting system at the exit of the extruder in order subsequently to be able to colour the two flows differently. The die according to the invention is then positioned directly downstream. If a single-screw is used, it is also necessary to locate a flow-splitting system before the die or dies according to the invention. Advantageously, the system forming the subject of European Patent No. 95100350.8, filed 12 Jan. 1995, is used.

Using the die according to the invention, it is possible to prepare any type of product coming from an extrusion-cooking system, namely a product for human consumption, such as breakfast cereals (temperature of between 120° and 200° C.) and animal-feed products, such as dry products (temperature of between 100° and 130° C.), that is to say having a moisture content of less than 15%. It is also possible to work with an extrusion system, for example for manufacturing pasta (temperature of the order of 70° C.). Finally, it is also possible to envisage the die according to the invention for manufacturing frozen products, such as ice creams. In this case, it is necessary to provide cooling means, for example a jacket in which coolants circulate, both on the barrel of the twin-screw or single-screw and on the die, so as to reach a temperature equal to or less than −8° C.

The advantage of this die is that it requires only a single extruder or a single machine allowing the dough to be pushed through the die.

The starting dough may or may not be coloured. If split and already-coloured flows are used, it now remains only to direct the said flows into the die according to the invention. If a single flow of noncoloured dough is used, it is firstly necessary to split the flows and to colour them by injecting the desired colorants at this stage. It is also possible at this stage to adjust the viscosities of each flow by adding water. The flows may furthermore receive at this stage the addition of various nutritional, textural and other elements.

It will be clearly understood that, in the die according to the invention, the supply tube plays an essential role. This is because, in the first zone, it is necessary for component A to be formed as an extrudate with a star cross-section so as to prepare the inflow into the second zone of the component B. As this second zone has a circular cross-section, it allows the said second component to fill the space between the branches of the star. The third zone of the tube then allows components A and B to be combined in a progressive and prolonged manner.

The first zone of the supply tube may have a cross-section in the form of a star with between 3 and 6 branches. In this case, it is obvious that it is necessary to provide the corresponding number of longitudinal openings, namely between 3 and 6 openings, in the second zone, the said openings emerging between the branches of the star. In this second zone, the ratio of opening to total surface area represents 1:4 to 1:2. The third zone of the supply tube normally has a circular cross-section, like the second zone, but it may also have a square, oval or triangular shape.

At the exit of the die, a system of rotary cutters is provided which cut the exiting extrudate to the desired length, either in the form of sausages of between 5 and 50 mm in length or in the form of croquettes of smaller size.

In the supply tube, it is possible to work with different ratios with regard to the lengths between the first, second and third zones. These ratios are normally between 3:1:1 and 1:1:1. It is preferred to work with a ratio of 2:1:1.

For reasons of ease of cleaning, the distributor and the nozzle form two separate pieces. It is also conceivable that they form only a single piece.

The rest of the description is given in conjunction with the drawings.

DETAILED DESCRIPTION OF THE DRAWINGS

Figure 1:
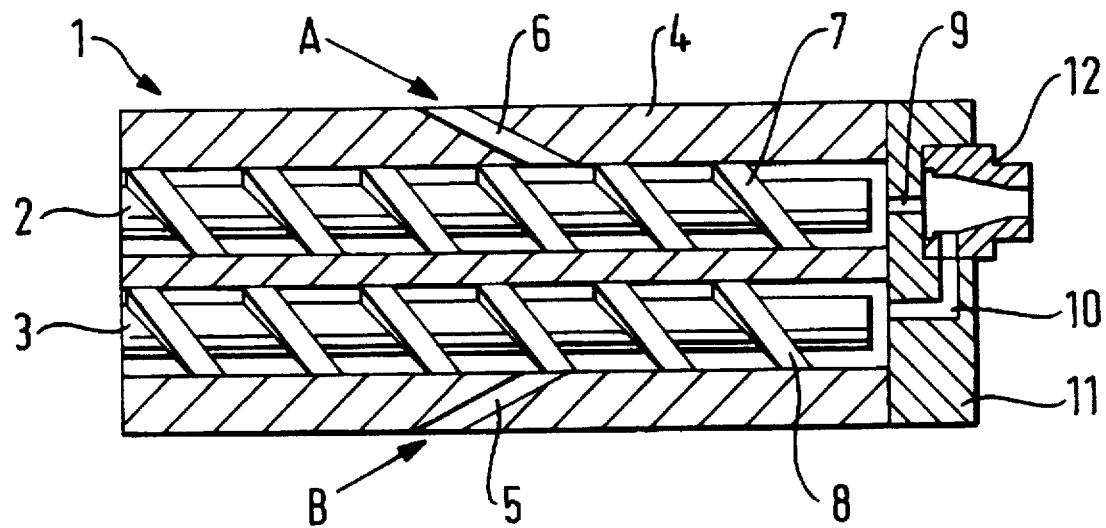
FIG. 1 is a diagrammatic representation in partial section of a twin-screw system.

FIG. 1 shows a conventional extruder (1) with two screws (2, 3). It comprises a barrel (4) in which the two aforementioned screws are placed, these screws being rotationally driven by a gear-motor set (not shown). Helically wound on each screw is, respectively, a flight (7), (8), of defined pitch. Bores (5, 6) allowing inflow of components A and B are provided in the barrel (4); these components are driven by the rotation of the screws (2, 3) towards the outlet channels (9, 10) located in a flow-splitting plate (11). The two flows then join and converge on the die (12) according to the invention.

Figure 2:
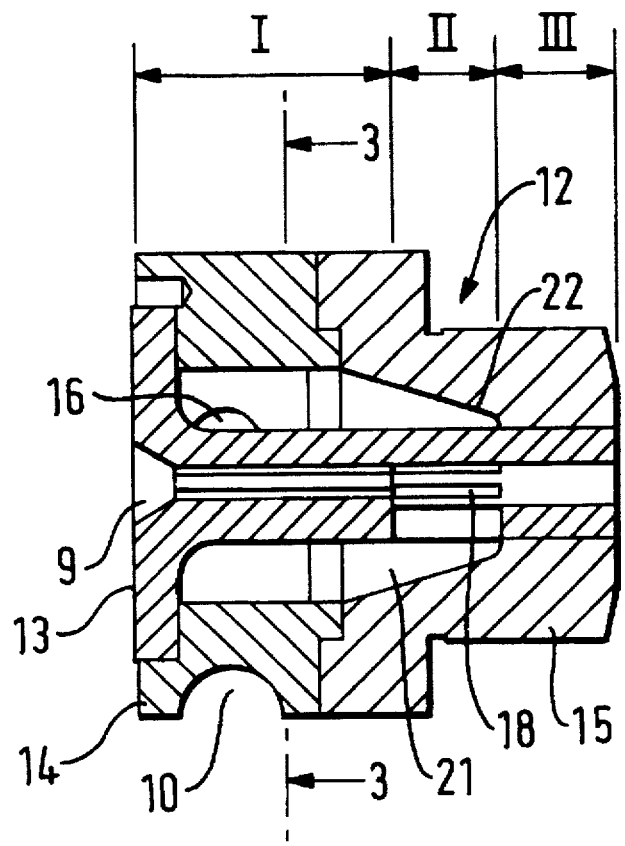
FIG. 2 is a longitudinal section of the die according to the invention.
Figure 3:
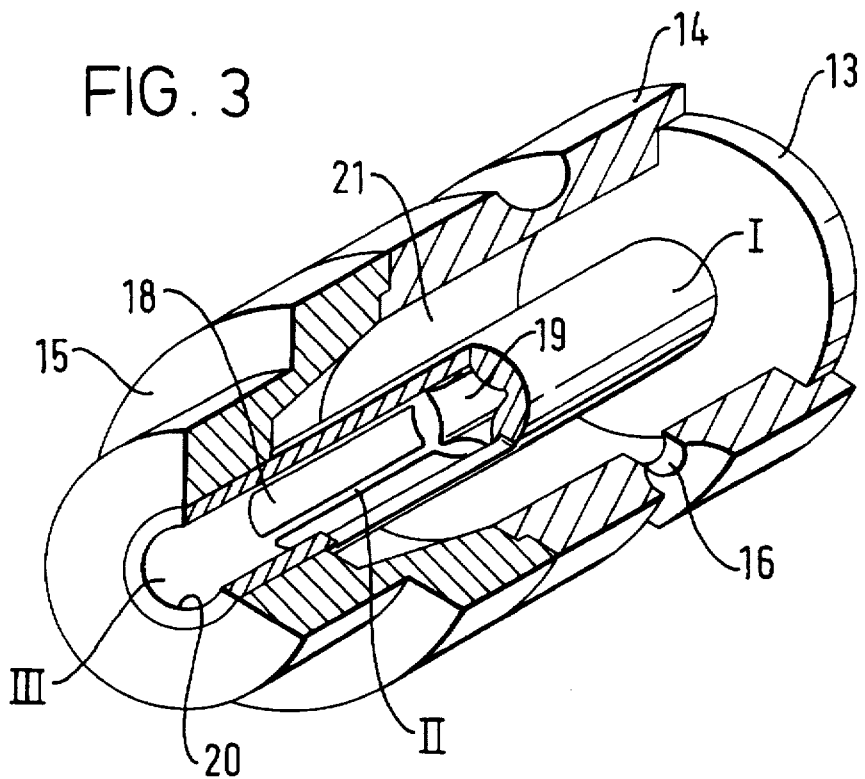
FIG. 3 is a perspective representation of the die according to the invention.

Referring to FIGS. 2 and 3, the die (12) comprises a supply tube (13) for the central component A, a hollowed distributor (14) and a hollowed nozzle (15) extending the distributor.

The tube (13) has three wall portion zones which provide a zone I with a tube wall portion which has a cross-section which is continuous and which has an interior wall surface which is shaped to provide radial projections and recesses which defines an outline of a star-like, illustrated as a five-branched, or pointed, star shape, and which provide a zone II with longitudinal openings (18) positioned between longitudinally extending tube wall segments, thereby defining a discontinous cross-section wall portion, and which provide a zone III which is a tube wall portion continuous in cross section. In the zone I, the tube has a bore (19) which is defined by the tube interior wall surface which delineates the outline of the 5-branched star whereas, in the zones II and III, the tube has a circular cross-section and has a bore (20). The chamber (21) is created by the space between an exterior wall surface of the tube (13) and an interior wall surface of the distributor (14) and an interior wall surface of the nozzle (15) which extends to the distributor chamber and meets with the tube (13) to provide a chamber and enclosure.

In operating the flow of component A flowing in through the channel (9) enters the tube (13) and is shaped along the bore (19) in the form of a 5-branched star. Component B flowing in through the channel (10) penetrates into the chamber (21) through the opening (16) made in the distributor (14).

Flow A therefore occupies the centre of the tube (13) as well as the branches of the star. Within the chamber (21), flow B is brought into contact with flow A. Flow B is introduced into the nozzle via the distributor (14). Flow B penetrates into the tube by means of the longitudinal openings (18), of calculated length, in the wall of the tube (13). It is forced through the conical part (22) of the nozzle (15) and occupies the free space between the branches of the star occupied by flow A inside the tube (13). The two flows are then in contact, and since they are locked inside the tube, they combine over a well-defined length (zone III).

Figure 4:
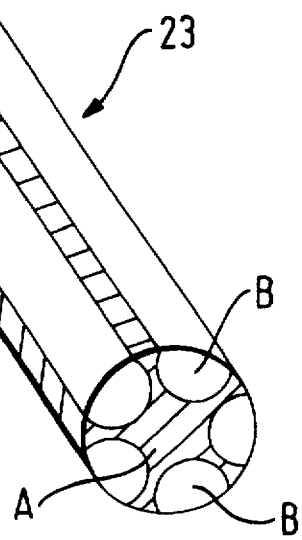
FIG. 4 is a perspective representation of the product obtained using the die according to the invention.

The extrudate then leaves the tube (13) and is cut to the desired length. FIG. 4 shows the extrudate (23) consisting of components A and B. The die according to the invention allows a composite product to be obtained in which it is possible immediately to see the two constituents, this having a certain appeal for the consumer.

We claim:

1. An extrusion die comprising:
   a tubular member comprising three successive and integral longitudinally extending tubular member portions comprising wall members having interior wall surfaces about a hollow and exterior wall surfaces and wherein:
      a first portion comprises a wall continuous in cross-section and wherein, in cross-section, the interior wall surface comprises radial projections and recesses therebetween so that the interior wall surface defines a shape which is an outline of a star-like shape,
      a second portion extends longitudinally from the first portion and comprises a plurality of longitudinally extending wall segments spaced apart one from another by longitudinally extending openings so that the second portion, in cross-section, is discontinuous and so that the openings are in alignment with the first portion interior wall surface radial projections, and
      a third portion extends longitudinally from the second portion and is continuous in cross-section;
   a hollowed distributor portion comprising a wall which comprises an exterior wall surface and an interior wall surface wherein the distributor portion interior wall surface extends longitudinally along a length of, cross-sectionally surrounds and is displaced a distance from the first tubular member portion exterior wall surface to define a chamber about the first tubular member portion exterior wall surface and which comprises a wall member portion which extends from the distributor portion exterior wall surface through the distributor portion wall to the distributor portion interior wall surface to define an opening for feeding an extrudable component substance into the chamber; and
   a hollowed nozzle portion comprising a wall which comprises an interior wall surface which is integral with the distributor portion wall and which extends from the distributor portion interior wall surface to the third tube portion exterior wall surface to define a chamber extension and chamber end enclosure.

2. A die according to claim 1 wherein the surface area of the second tubular member portion openings and the total surface area of the second tubular member portion are in a ratio from 1:4 to 1:2.

3. A die according to claim 1 or 2 wherein the first, second and third tubular member portions have lengths in a ratio, respectively, of between 3:1:1 to 1:1:1.

4. A die according to claim 1 or 2 wherein the first, second and third tubular member portions have lengths in a ratio, respectively, of 2:1:1.

5. A die according to claim 1 wherein the first tubular member portion interior wall surface cross-section defines a shape which has between three and six star-like branches and wherein the second tubular member portion has a same number of openings as the number of first tubular member portion branches.

6. A die according to claim 1 wherein the distributor portion and nozzle portion are a single piece.

7. A die according to claim 1 wherein the distributor portion and nozzle portion are two separable pieces.

* * * * *

UNITED STATES PATENT AND TRADEMARK OFFICE
CERTIFICATE OF CORRECTION

PATENT NO. : 5,718,926
DATED : February 17, 1998
INVENTOR(S) : Marc DAMBRINE, et al.

It is certified that error appears in the above-indentified patent and that said Letters Patent is hereby corrected as shown below:

Column 3, line 57, change "defines" to -- define --.

Column 3, line 57, after "star-like" and before the comma, insert -- shape --.

Signed and Sealed this

Eighteenth Day of August, 1998

Attest:

BRUCE LEHMAN

Attesting Officer      Commissioner of Patents and Trademarks